Figures 1, 2:
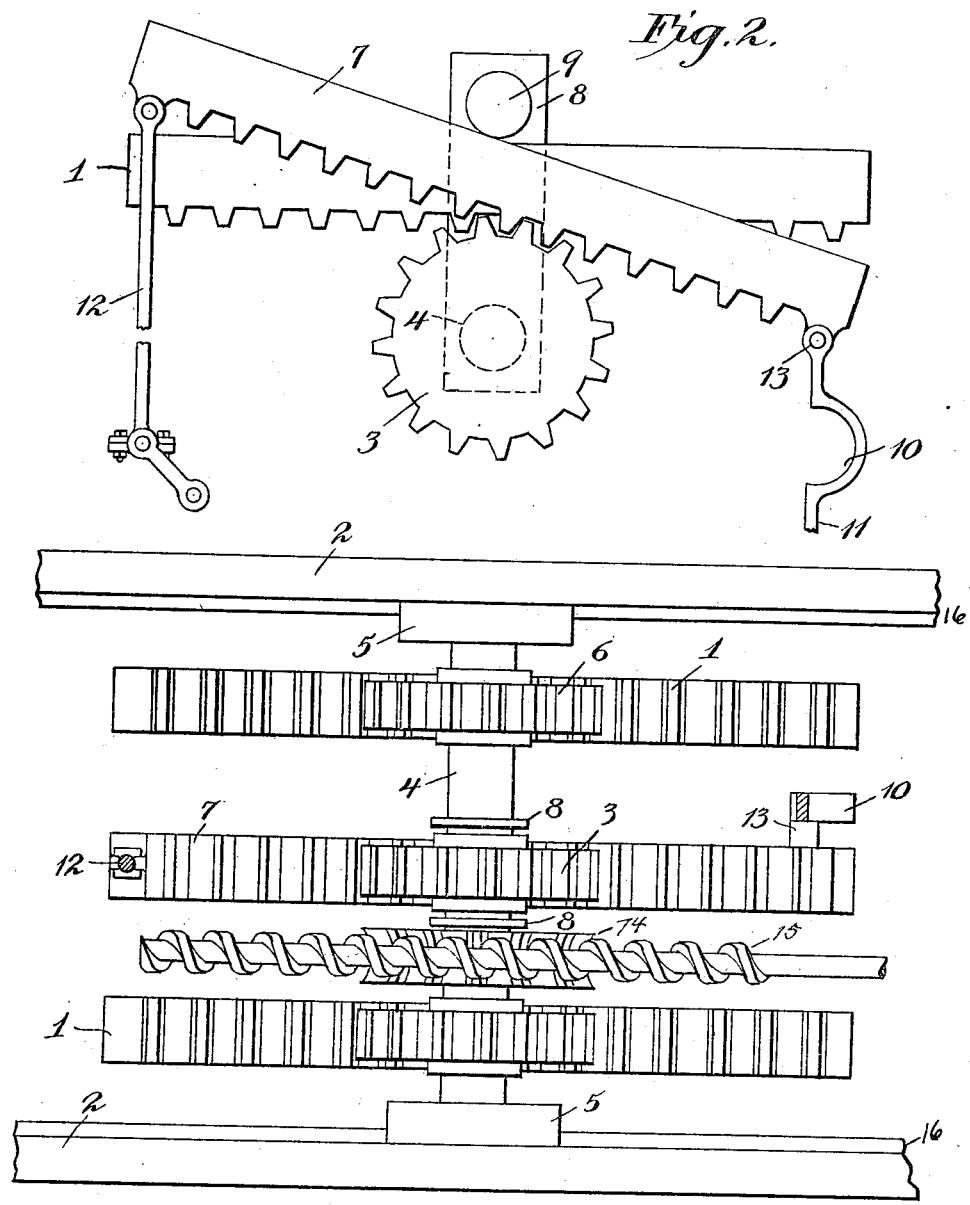

R. L. HALL.
FULCRUM CHANGING MACHINE.
APPLICATION FILED JAN. 29, 1917.

1,271,568.

Patented July 9, 1918.

Inventors:
Maciel Hall
R L Hall Jr.

Inventor:
Royal L Hall

UNITED STATES PATENT OFFICE.

ROYAL L. HALL, OF BUFFALO TOWNSHIP, MARQUETTE COUNTY, WISCONSIN.

FULCRUM-CHANGING MACHINE.

1,271,568.

Specification of Letters Patent.

Patented July 9, 1918.

Application filed January 29, 1917. Serial No. 145,212.

*To all whom it may concern:*

Be it known that I, ROYAL L. HALL, a citizen of the United States, residing at Buffalo township, in the county of Marquette and State of Wisconsin, have invented a new and useful Fulcrum-Changing Machine, of which the following is a specification.

My invention relates to improvements in fulcrum changing machines in which the fulcrum is a cogwheel and the lever is a rack; said cog-wheel being on a shaft near the ends of which are cogwheels identical with the one used as a fulcrum. These cogwheels fit stationary racks identical with the lever rack, so that when the shaft is moved the fulcrum is changed without moving the lever out of place though the lever rack be in motion, the fulcrum cogwheel rolling along the lever rack guided by the cogwheels near ends of shaft that roll along the stationary racks and by moving the shaft into the semi-circle in the driven connecting rod to where the center of the shaft is in line with the ends of said connecting rod, said connecting rod will be without motion though the lever rack be in full motion. I attain these objects by the mechanism illustrated in the accompanying drawing in which—

Figure 1 is a section of the entire machine not showing connecting rods; Fig. 2 is a plan view of the machine showing connecting rods as it appears after the removal of one of the stationary racks.

Similar numerals refer to similar parts throughout both views.

The stationary racks 1 and the standards 2 constitute the frame work of the machine.

The fulcrum cog wheel 3 and the guide cog wheels 6 and the worm wheel 14 are fastened on shaft 4.

Lever rack 7 is held in mesh with fulcrum cog wheel 3 by clevis 8 with roller bearing 9.

On ends of shaft 4 sliding boxes 5 are held parallel with stationary racks 1 by flanges 16 on standards 2 thus holding guide cog wheels 6 in mesh with stationary racks 1.

Semi-circle 10 is to allow the center of the fulcrum to come in line with center of the connection 13.

Connection 13 is at the side of the lever rack 7 opposite the point of the cog at which said connection is made this allows driven connecting rod 11 to be at the side of the fulcrum cog wheel 3 so that the fulcrum may be shifted so that shaft 4 enters semicircle 10.

The fulcrum is shifted by turning worm 15 which turns wormwheel 14 which turns shaft 4 which turns guide cog wheels 6 which causes guide cog wheels 6 to roll on stationary racks 1 which causes fulcrum cogwheel 3 to roll on lever rack 7 without moving lever rack 7 endwise.

The motion of the driven connecting rod 11 is stopped by shifting the fulcrum 3 until the center thereof is in line with connection 13, without stopping the motion of lever rack 7 driven by driving connecting rod 12.

Having fully described my invention what I claim as new and desire to secure by Letters Patent is—

1. In a device of the class described, supporting members, a shiftable fulcrum member slidingly supported thereby, a lever on said fulcrum member, and means for shifting said fulcrum member, comprising a pair of stationary racks, cogwheels on said fulcrum member coöperating with said racks, and worm screw gearing.

2. In a device of the class described supporting structure, a shiftable fulcrum member slidably supported thereon, an operating member supported by said fulcrum member and means including a plurality of stationary racks for shifting said fulcrum member.

In testimony that I claim the above I have hereunto subscribed my name in the presence of two witnesses.

ROYAL L. HALL.

Witnesses:
 MACIEL HALL,
 ROYAL L. HALL, Jr.

Copies of this patent may be obtained for five cents each, by addressing the "Commissioner of Patents, Washington, D. C."